Sept. 29, 1964  J. D. WATTS  3,150,889
COUPLING WITH RIGIDLY FIXED SEALING RING
Filed Oct. 11, 1960

INVENTOR
JOHN D. WATTS

BY Cushman, Darby & Cushman
ATTORNEYS

United States Patent Office 3,150,889
Patented Sept. 29, 1964

3,150,889
COUPLING WITH RIGIDLY FIXED SEALING RING
John D. Watts, Houston, Tex., assignor to Gray Tool Company, Houston, Tex., a corporation of Texas
Filed Oct. 11, 1960, Ser. No. 62,008
4 Claims. (Cl. 285—332.2)

The present invention relates to sealing couplings or connections for such as conduit parts. The ends of the parts to be sealed are formed to engage with a sealing ring of hard metal or the like to form a seal capable of withstanding high fluid pressure when the ends of the parts are drawn toward one another. While the description refers to conduit parts, it will be understood that this term is intended to apply to the connection of other hollow parts, which carry or contain high pressure fluid.

The invention provides conduit connections which have a full opening into the conduit or pipe to which the connection is applied so that operations within the conduit which require the full interior width thereof, can at all times be performed, yet while reducing the area subject to pressure within the conduit to substantially a minimum. It is an object of the invention to provide designs of conduit connections, whereby the sealing areas of the conduit parts are continuously protected against injury which would impair their sealing effectiveness, and to provide such conduit connections which will resist the corrosive action of fluids passing through the conduits.

It is a further object of the invention to provide conduit connections having novel sealing rings, for conveniently joining conduits of different diameters, and also to provide sealing connections for use on oil well drilling pipes, as well as on other pipes and at other points where high pressure seals are required.

These and other objects of the present invention will become more apparent during the course of the following detailed description and appended claims.

The invention may best be understood with reference to the accompanying drawings wherein an illustrative embodiment is shown.

Figure 1:
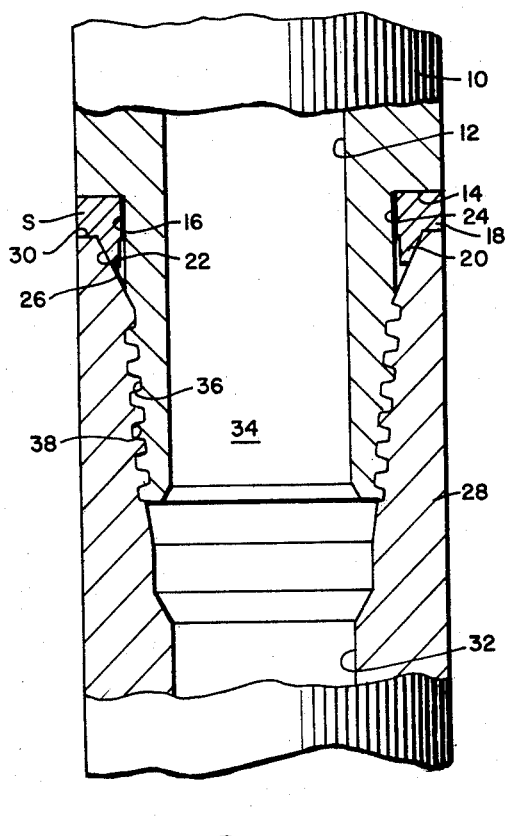
FIGURE 1 is a vertical sectional view of a coupling embodying the principles of the present invention.

Referring now more particularly to FIGURE 1, there is shown therein a coupling of the type utilized in connecting oil well parts, such as tubing string sections and the like. The coupling includes a first tubing string part 10 having an interior bore 12 extending therethrough. The end of the part 10 to be coupled has an annular end surface 14 which extends inwardly in a radial plane from the outer periphery thereof. The end surface terminates adjacent the inner end of a longitudinally extending surface 16 which is cylindrical in shape. The surfaces 14 and 16 of the part 10 are adapted to receive and engage a sealing ring S constructed in accordance with the principles of the present invention.

The sealing ring S comprises an annular rib portion 18 having a flexible annular lip 20 extending therefrom. The annular lip is provided with an exterior sealing surface 22 which extends outwardly toward the rib portion 18 at an acute angle with respect to the longitudinal axis of the rib. As shown, the rib portion extends radially outwardly from the lip 20 and the inner periphery of the rib defines a longitudinally extending surface 24 which, like the surface 16, is cylindrical in shape. The cylindrical surface 24 of the sealing ring normally is of a diameter size slightly less than the diameter size of the cylindrical surface 16 of the part 10 and the sealing ring is rigidly fixed to the part as by conventional shrink fit procedure with the longitudinally extending surfaces 16 and 24 in engagement and the radially extending surface of the rib portion opposite from the lip 20 in engagement with the end surface 14 of the part.

The sealing surface 22 of the lip 20 is adapted to engage and be deflected by and sealed with a sealing surface 26 formed on a second part 28 to be coupled with the part 10, the part 28 having an end surface 30 adjacent the surface 26 which communicates with a through bore 32 of the part 28.

Suitable means is provided for drawing the end surfaces 14 and 30 of the parts 10 and 28 toward one another to effect sealing engagement of the sealing surfaces 22 and 26. As shown, such means comprises an interior collar portion 34 formed integrally on the part 10 and extending outwardly therefrom beyond the end surface 14. It will be noted that the extremity of the collar portion adjacent the end surface 14 defines the longitudinally extending cylindrical surface 16. The outer periphery of the collar portion at a position adjacent its opposite extremity is suitably threaded, as indicated at 36, to engage cooperating threads 38 formed in the bore 32 of the part 28.

The sealing ring S is preferably made of elastic steel, at least, the lip portion is sufficiently elastic so that it may be bent inwardly, within the elastic limit of the metal, when the two parts are drawn toward one another by the interengagement of the threads 36 and 38. While it is preferred that the sealing ring be made of an elastic hard metal, such as steel, it could be made of softer metals such as brass, or even suitable plastics, such as Bakelite. However, the elastic steel is preferred, so that when the lip of the ring is bent inwardly within the elastic limit of the metal it will return to the normal position when the force is removed so that a particular sealing ring rigidly attached to a part can be re-used in connecting such part.

When the parts are hand tightened together, initial contact is made at the outer extremities of the lips against the sealing surface 26. The acute angle between the horizontal center line of the rib portion 18 and the outer sealing surface of the lip is somewhat greater than the acute angle between this center line and the sealing surface 26 on the conduit part 28 (e.g. of the order of 1°). On the other hand, the corner point between the sealing surface 26 and end surface 30 on the part 28 and the juncture point between the sealing surface 22 and adjacent rib portion surface of the sealing ring are in longitudinal alignment. Accordingly, when the two parts are drawn toward one another by further engagement of the threads 36 and 38, the angle of the sealing surface 22 becomes progressively more acute up to the point where the end surface 30 is brought to a stop when it engages the flat surface of the rib 18, at which time the engaging sealing surfaces on the lip of the sealing ring and on the end of the part 28 are parallel with and flush against one another, as shown in FIGURE 1. As the seal is completed, the lip of the sealing ring is flexed inwardly around a pivot point on the rib portion of the sealing ring, which pivot point is somewhere in the neighborhood of the base end of the sealing lip adjacent to the corner point defined by the sealing surface 26 and end surface 30.

Thus, when the parts are tightened to their limited position, as indicated above, the sealing lip of the sealing ring is deflected inwardly. Because this deflection is within the elastic limit of the metal from which the lip is made, energy is stored in the lip and it places itself tightly against the sealing surface 26 of the conduit part 28. When the threads are fully engaged, as shown in FIGURE 1, the sealing surface of the lip is tight and sealingly engages with the sealing surface on the part 28 and thereafter, when the coupling is subjected to pressure, this pressure will leak through the interengaged threads 36 and 38 and be exerted outwardly against the lip of the sealing ring to make the sealing action more effective.

The shrink fit of the sealing ring on the part 10 provides a fluid tight high pressure seal between the longitudinally extending surfaces 16 and 24 which is of a permanent nature. The advantage of shrink fitting a separate sealing ring on the end of the part 10, rather than to form the lip and abutting surface integrally from the material of the part 10, is that a more expensive and thus more effective material can be utilized in the sealing ring, thus enabling a less expensive material to be employed in the conduit part 10 itself. Moreover, the sealing ring can be separately machined to desired tolerances and handled much more readily than, for example, a long conduit part such as a tubing string section or the like.

It will be understood that only a moderate turning force will be required to be exerted on the parts 10 and 28 in order to deflect the sealing lip inwardly to the position shown in FIGURE 1; yet, the coupling is a completely effective one because the pressure subject area is substantially reduced and the pressure acts against the lip of the sealing ring to increase effectiveness of the seal thus formed. With the construction illustrated, the attendant will always know when he has properly tightened the two parts for it is only necessary that he tighten them until the tightening action is stopped, by the contact of the end surface 30 of the part 28 with the rib portion 18 of the sealing ring. Furthermore, it is not possible for the attendant to turn the parts to a point where the sealing ring would be crushed, for the rib portion 18 provides a definite stop against excessive makeup and subsequent operating loads. The rib portion 18 of the sealing ring is of such design that it maintains a constant diameter and is not drawn inwardly during the clamping action, the only movement of the sealing ring being the inward bending of the lips thereof, as described.

When the coupling is tightened, a substantially unitary structure results, the strength of the material of the ends of the conduit parts serving to back up the sealing ring whereby extremely high pressures may be withstood. The rib portion 18 of the sealing ring provides increased strength in order to resist any bursting tendency at the coupling caused by high fluid pressure which is being handled. The sealing ring is of symmetrical design, so that it is self-aligned when placed in position with the end of the other conduit part.

While the coupling, as shown in FIGURE 1, embodies two conduit parts, such as tubing string sections or the like utilized in oil well installations, it will be understood that the coupling would have general applicability in effecting a connection between other conduit parts which carry high pressure fluid as well as container or receptacle parts which hold a fluid pressure. It will also be understood that other means may be provided in the coupling for drawing the two parts toward one another to effect a sealing. For example, the two parts may be provided with exterior flanges which may be bolted together or clamped together.

Figure 2:
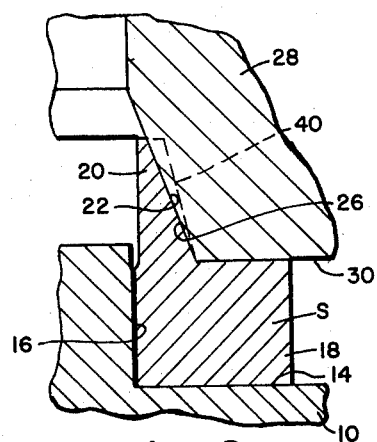
FIGURE 2 is an enlarged fragmentary vertical sectional view of a somewhat modified coupling.

FIGURE 2 illustrates more in detail the manner in which the sealing surface of the lip of the sealing ring is deflected during the make up of the coupling. As shown in dotted lines and indicated at 40 (exaggerated for purposes of emphasis), the sealing surface in its normal, undeflected position extends outwardly at a slight angle with respect to the sealing surface 30 prior to make up of the coupling. FIGURE 2 also illustrates how the sealing ring would be utilized in a coupling in which the interior collar 34 is eliminated and a suitable exterior securing means is provided (not shown).

Figure 3:
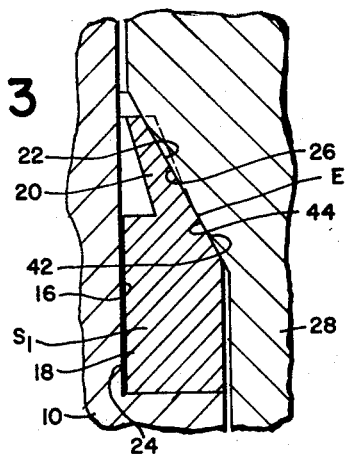
FIGURE 3 is a view similar to FIGURE 2 showing another modification of the coupling.

FIGURE 3 shows a modified sealing ring S1 wherein the stop or limiting surface, as indicated at 42, of the sealing ring is provided as a continuation of the sealing surface 22 of the lip 20. The cooperating surface as indicated at 44 on the other part 28, forms a continuation of the sealing surface 26 thereof. With this arrangement the point indicated at E is of the division point between the deflected portion of the ring and the known effective load bearing portion. In FIGURE 3 the portion of the ring below the point E is machined to the same taper as the sealing surface 26 which it contacts, whereas the surface 22 above the point E is turned on a smaller angle than the seat 26 which it contacts. With this construction, two important things are fixed; (a) the degree of deflection that can occur, and (b) the amount of load bearing area in contact with the maximum degree of deflection is attained. When no such fixed conditions prevail, the degree of deflection and amount of load bearing area is dependent on how tightly the connection is actually made up.

Figure 4:
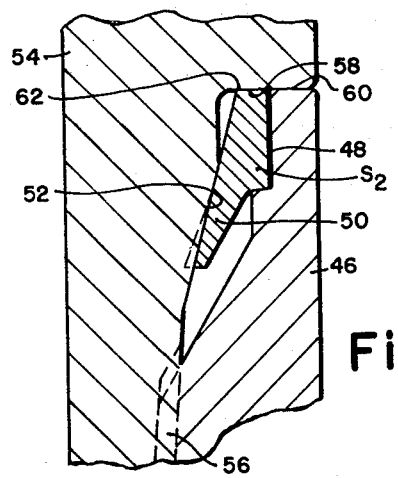
FIGURE 4 is a view similar to FIGURE 2 showing still another modification of the coupling.

In FIGURE 4 a modified sealing ring S2 is shrunk inside the end of a pipe section 46, at 48. It has a sealing lip 50 which is engaged and deflected by a sealing surface 52 of a pipe section 54, the latter being threaded into the pipe section 46 below or inwardly of the sealing ring as at 56. The pipe section 54 has a shoulder or stop surface 58 which contacts the end surface 60 of the pipe section 46, as well as the end surface 62 of the ring S2, at the same time the lip 50 is deflected to the proper degree, to insure the kind of seal as has been referred to herein.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A sealing coupling comprising first and second annular parts having annular end surfaces presented toward one another to be connected together and sealed against a fluid under pressure within said parts, one of said parts having an outwardly tapering sealing surface adjacent the end surface of the part extending at an acute angle with respect to the longitudinal axis of the part, the other of said parts having a longitudinally extending annular surface adjacent the end surface thereof, an annular sealing ring of hard metal or the like for providing a seal between the end surfaces of said parts when they are drawn toward one another, said sealing ring comprising a rib portion having a single flexible annular lip extending therefrom, said rib portion including a complementary longitudinally extending annular surface of a size normally slightly different than the size of said first mentioned longitudinally extending surface, said sealing ring being rigidly fixed on the other of said parts with said longitudinally extending surfaces in engagement and one side of said rib portion in engagement with the adjacent end surface of said other part, said lip having an exterior sealing surface tapering outwardly arranged to engage and be deflected by and to seal with the sealing surface of said one part when the end surfaces of said parts are drawn toward one another, the opposite side of said rib portion being engageable with the end surface of said one part in response to the movement of the end surfaces of said parts toward one another to limit the degree of such movement, and means for drawing the end surfaces of said parts toward one another to such limit to effect the seal.

2. A coupling as defined in claim 1 wherein said lip sealing surface is deflected outwardly by the engagement of said part sealing surface therewith.

3. A coupling as defined in claim 1 wherein said lip sealing surface is deflected inwardly by the engagement of said part sealing surface therewith.

4. A coupling as defined in claim 1 wherein the end surface of said one part arranged to engage the opposite side of said rib portion to limit the movement of the end surface of said parts toward one another constitutes a continuation of said one part sealing surface and said opposite side of said rib constitutes a continuation of said lip sealing surface disposed at an angle equal to the angle assumed by said lip sealing surface when deflected.

References Cited in the file of this patent

UNITED STATES PATENTS

| | | |
|---|---|---|
| 160,855 | Vavasseur | Mar. 16, 1875 |
| 2,181,343 | Reimschissel | Nov. 28, 1939 |
| 2,239,942 | Stone et al. | Apr. 29, 1941 |
| 2,539,057 | Brown | Jan. 23, 1951 |
| 2,746,486 | Gratzmuller | May 22, 1956 |
| 2,752,668 | Sheen | July 3, 1956 |
| 2,766,999 | Watts et al. | Oct. 16, 1956 |
| 2,793,059 | Woodling | May 21, 1957 |
| 3,003,795 | Lyon | Oct. 10, 1961 |

FOREIGN PATENTS

| | | |
|---|---|---|
| 163,509 | Sweden | June 10, 1958 |